US008662436B2

(12) United States Patent
DeMenezes et al.

(10) Patent No.: US 8,662,436 B2
(45) Date of Patent: Mar. 4, 2014

(54) APPARATUS FOR ADJUSTING THE PAYOUT OF TETHER FROM A REEL ASSEMBLY

(75) Inventors: Brian DeMenezes, Belleair Bluffs, FL (US); Don Blackman, Bradenton, FL (US); Brian Ford, Seminole, FL (US); Marc Jung, Indian Shores, FL (US); Justin Robinson, Parish, FL (US); Kevin Holler, Belleair, FL (US); Joel Harshbarger, Palmetto, FL (US)

(73) Assignee: Carleton Life Support Systems Inc., Davenport, IA (US)

( * ) Notice: Subject to any disclaimer, the term of this patent is extended or adjusted under 35 U.S.C. 154(b) by 602 days.

(21) Appl. No.: 12/977,292

(22) Filed: Dec. 23, 2010

(65) Prior Publication Data

US 2012/0160948 A1     Jun. 28, 2012

(51) Int. Cl.
*B60R 22/38* (2006.01)
(52) U.S. Cl.
USPC ........................................ 242/382.4; 242/396
(58) Field of Classification Search
USPC ......................... 242/382.4, 396, 396.1–396.3
See application file for complete search history.

(56) References Cited

U.S. PATENT DOCUMENTS

| 2,193,619 | A | * | 3/1940 | Clements | 242/394.1 |
| 2,312,262 | A | * | 2/1943 | Murdoch et al. | 242/396.9 |
| 3,577,148 | A | * | 5/1971 | Holzschuh et al. | 343/821 |
| 4,801,105 | A | | 1/1989 | Frisk | |
| 5,636,807 | A | | 6/1997 | Warrick | |
| 7,275,710 | B2 | | 10/2007 | Van Druff et al. | |
| 8,251,304 | B2 | * | 8/2012 | Boyer et al. | 242/383 |
| 8,328,166 | B2 | * | 12/2012 | O'Brien et al. | 254/276 |
| 2009/0321550 | A1 | | 12/2009 | Boyer et al. | |

* cited by examiner

*Primary Examiner* — Sang Kim
(74) *Attorney, Agent, or Firm* — Katherine H. McGuire, Esq.; Woods Oviatt Gilman, LLP (57) ABSTRACT

Disclosed is an apparatus for selectively adjusting the maximum payout of a tether from a reel assembly. The maximum payout can be selected by the user via a dial indicator on the end of the apparatus. By rotating the dial, an internal pawl is positioned relative to an associated ring gear. The ring gear includes a cut-out about its peripheral edge. The shaft of the reel assembly is rotatably interconnected to the ring gear via a series of gear reductions. After a predetermined about of tether has been paid out, the pawl encounters the cut-out about the ring gear. This, in turn, causes the pawl to engage the reel shaft to prevent further rotation. The maximum payout is determined by the initial spacing between the pawl and the cut-out.

16 Claims, 9 Drawing Sheets

APPARATUS FOR ADJUSTING THE PAYOUT OF TETHER FROM A REEL ASSEMBLY

TECHNICAL FIELD

This disclosure relates to a payout limiter. More specifically, the disclosure relates to an apparatus for adjusting the amount of tether to be dispensed from an associated reel.

BACKGROUND OF THE INVENTION

The use of harness reels is known in the background art. For instance, U.S. Pat. No. 4,801,105 to Frisk discloses a reel assembly for retracting and locking a shoulder harness. The assembly includes a strap supporting spool affixed to a ratchet wheel. When a strap is rapidly pulled from the reel, an inertia mass turns with respect to the reel. This causes the inertia mass to move forward axially and trip a dog which locks the reel.

Likewise, U.S. Pat. No. 5,636,807 to Warrick discloses an acceleration sensor for an aircraft employing an inertia weight. The inertia weight is movable within a chamber by way of a linkage. The linkage is such that it provides the same output in response to movement of the aircraft in multiple directions.

Although these inventions each achieve their respective objectives, there continues to be a need in the art for a reel assembly with a means to easily and effectively limit the maximum payout of the tether from the reel.

An aircrew restraint system is disclosed in commonly owned U.S. Pat. No. 7,275,710 to VanDruff et. at. VanDruff discloses a mobile aircrew restraint system that includes an overhead track and a trolley that runs along the track. The trolley carries a retractor which releases a webbing strap attached to a harness. The strap retractor is attached to the trolley and is controllable to limit the payout of the webbing strap.

Although each of the foregoing examples achieves its own particular objective, all suffer from common drawbacks. For example, none of these systems permit the payout of tether from a reel to be adjusted.

SUMMARY OF THE INVENTION

It is an advantage of the present apparatus to limit the payout of tether from a reel assembly.

Another advantage of the disclosed apparatus is to limit payout via a dial indicator that permits a user to easily select and visually confirm the maximum payout.

It is yet another advantage to fix a tether only after a maximum payout has been achieved.

Another advantage is to provide a payout limiter that can be fitted onto an existing reel assembly.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure and its advantages, reference is now made to the following descriptions, taken in conjunction with the accompanying drawings, in which.

Corresponding reference characters indicate corresponding components throughout the several views of the drawings.

DETAILED DESCRIPTION OF THE PREFERRED EMBODIMENT

The disclosure relates to a payout limiter apparatus for selectively adjusting the payout of tether from a reel assembly. The apparatus permits a maximum tether length to be selected by adjusting an associated dial. Rotating the dial positions a pawl trigger relative to an associated ring gear. The ring gear includes a cut-out about its peripheral edge. The shaft of the reel assembly is rotatably interconnected to the ring gear via a series of gear reductions. Dispensing the tether rotates the shaft and the ring gear. After a predetermined length of tether has been dispensed, the pawl trigger encounters the cut-out about the ring gear. This, in turn, causes a pawl to engage a ratchet associated with the reel shaft to prevent further rotation. The maximum payout of tether is controlled by selecting the initial spacing between the pawl trigger and the cut-out.

Reel Lock Assembly

Figure 1:
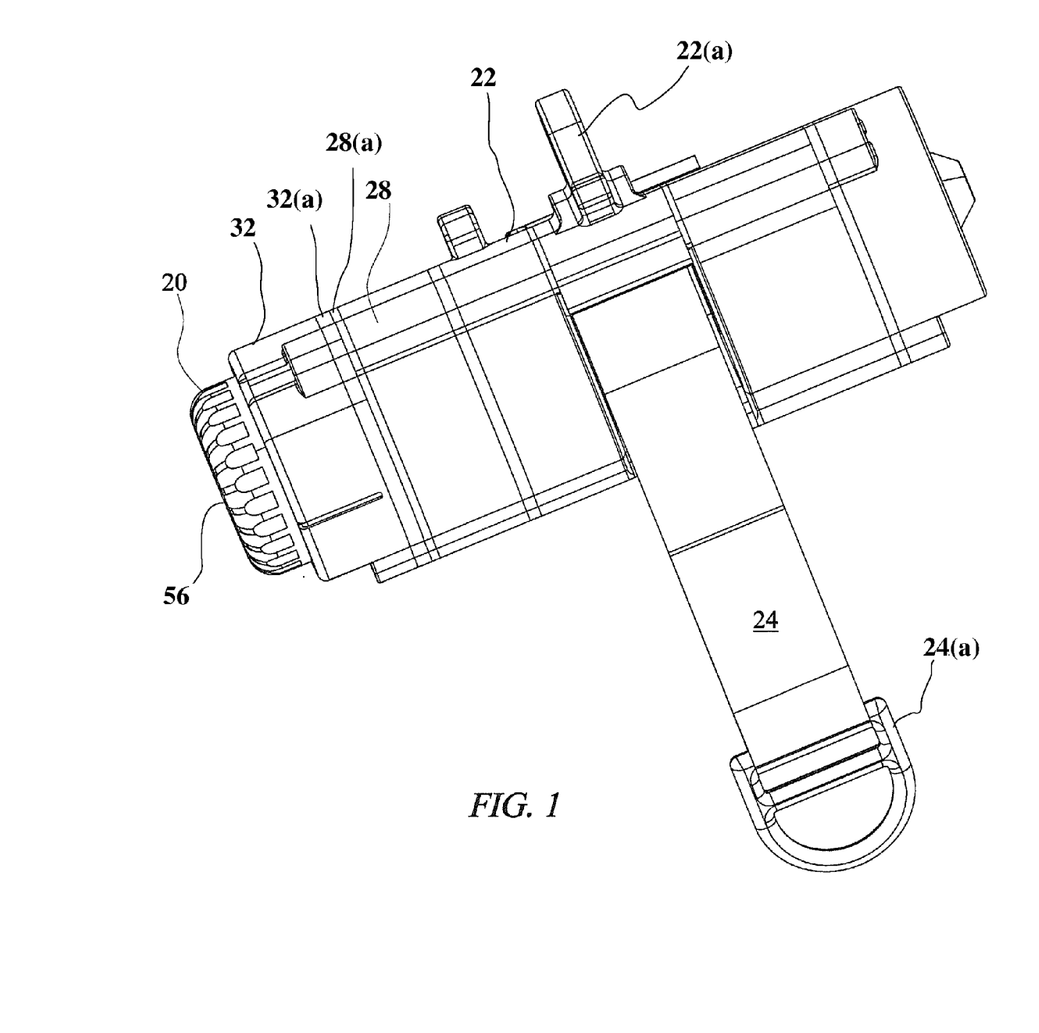
FIG. 1 is a perspective view of the disclosed payout limiter apparatus connected to a reel assembly.

The payout limiter apparatus 20 and the attached reel lock assembly 22 are illustrated in FIG. 1. Reel lock assembly 22 can be of a conventional construction and preferably includes a means for mounting it to the interior of a vehicle. Reel lock assembly 22 can be, for example, secured within the crew compartment of a helicopter. Reel lock assembly 22 includes one or more mounting brackets 22(a) for securing assembly 22 to an associated trolley and track 26 (note FIG. 2). Reel lock assembly 22 further includes an internal reel shaft (not shown) about which a length of tether 24 is wound or unwound. Tether 24 includes a clasp or buckle 24(a) at its distal end to permit the tether 24 to be secured to an individual within the vehicle. For example, buckle 24(a) can be secured to a harness upon an individual crew member. Reel shaft assembly 22 further includes associated mechanisms for winding and unwinding the tether 24 and for selectively locking tether 24 in response to sudden vehicle movements. A suitable locking mechanism 10 is disclosed in the cross sectional view of FIG. 5A. This locking mechanism includes a pawl 12 for locking engagement with ratchet 30 in response to a triggering event. The pawl 12 can be re-set to an unlocked orientation via reset switch 14.

Locking mechanism 10 is more fully disclosed in co-pending, and commonly owned, patent application Ser. No. 12/361,581, which is entitled "Reel Lock for Passenger Restraint Having Dual Locking Positions." The contents of this application are fully incorporated herein. The disclosed payout limiter 20 can be used in conjunction with still yet other types of reel locks.

Figure 2:
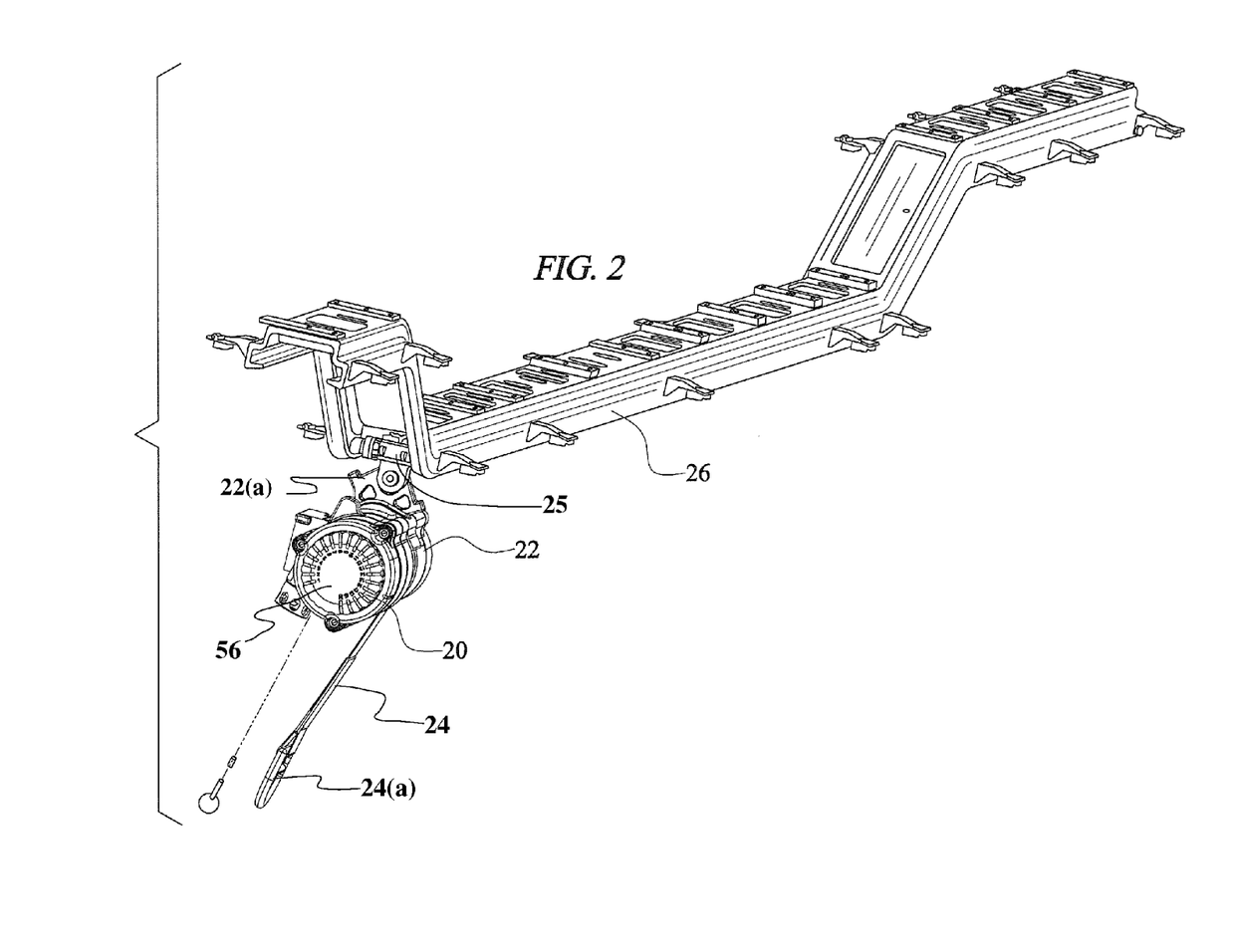
FIG. 2 is a perspective view of the disclosed payout limiter apparatus being used in connection with an overhead reel assembly and track.

FIG. 2 illustrates the reel lock assembly 22 and associated payout limiter 20 interconnected to an overhead restrain system, including a trolley 25 and track 26. Track 26 may be attached, for example, within the crew cabin of an aerial vehicle. The reel lock assembly 22, in turn, is slidably mounted along track 26 via trolley 25. A locking mechanism (not shown) is used to secure trolley 25 and reel assembly 22 at any of a number of discrete locations along the length of track 26. The restrained crewmember is permitted to walk within the crew cabin as trolley 25 and reel 22 slide along track 26. Further movement is provided as tether 24 is dispensed from assembly 22.

An example of a suitable overhead restraint system is disclosed in commonly owned U.S. Pat. No. 7,275,710 and entitled "Aircrew Restraint System." The contents of this patent are incorporated by reference herein. However, payout limiter 20 of the present invention can be used in connection with a variety of air, land, or sea based applications.

Housings and Dial

Figure 3:
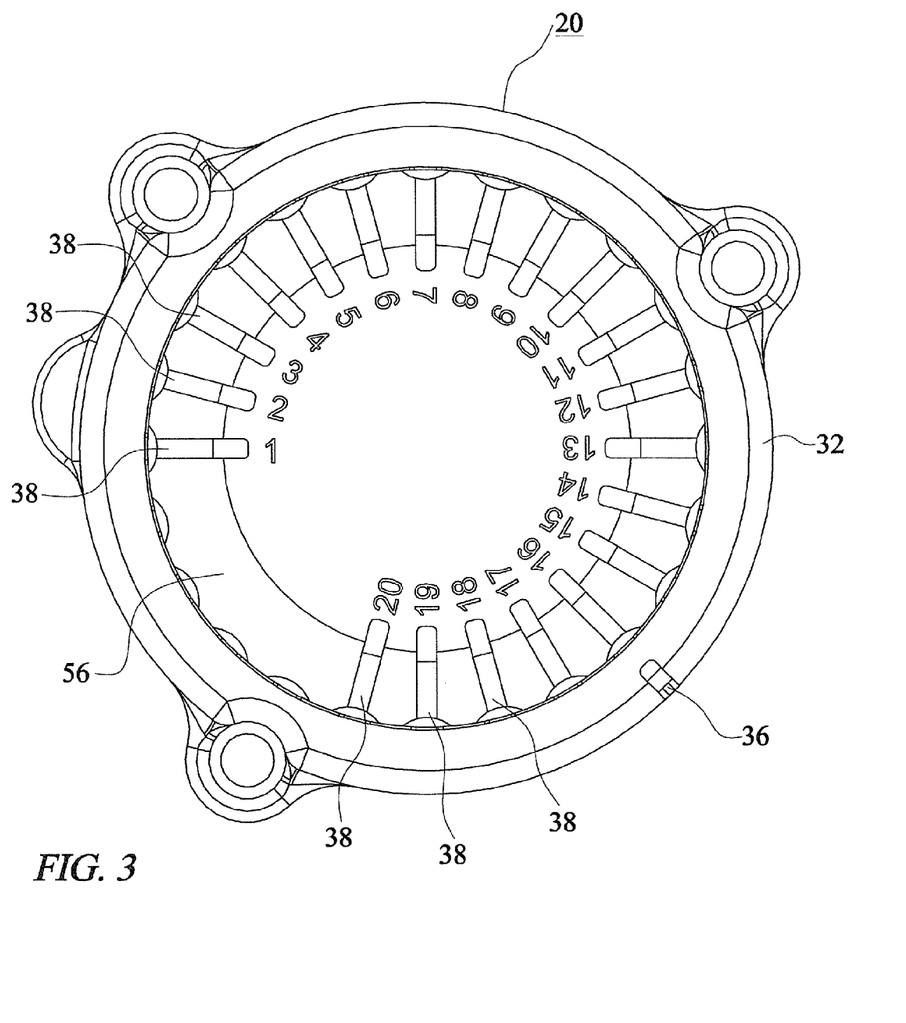
FIG. 3 is an end view of the dial of the payout limiter apparatus.
Figure 4:
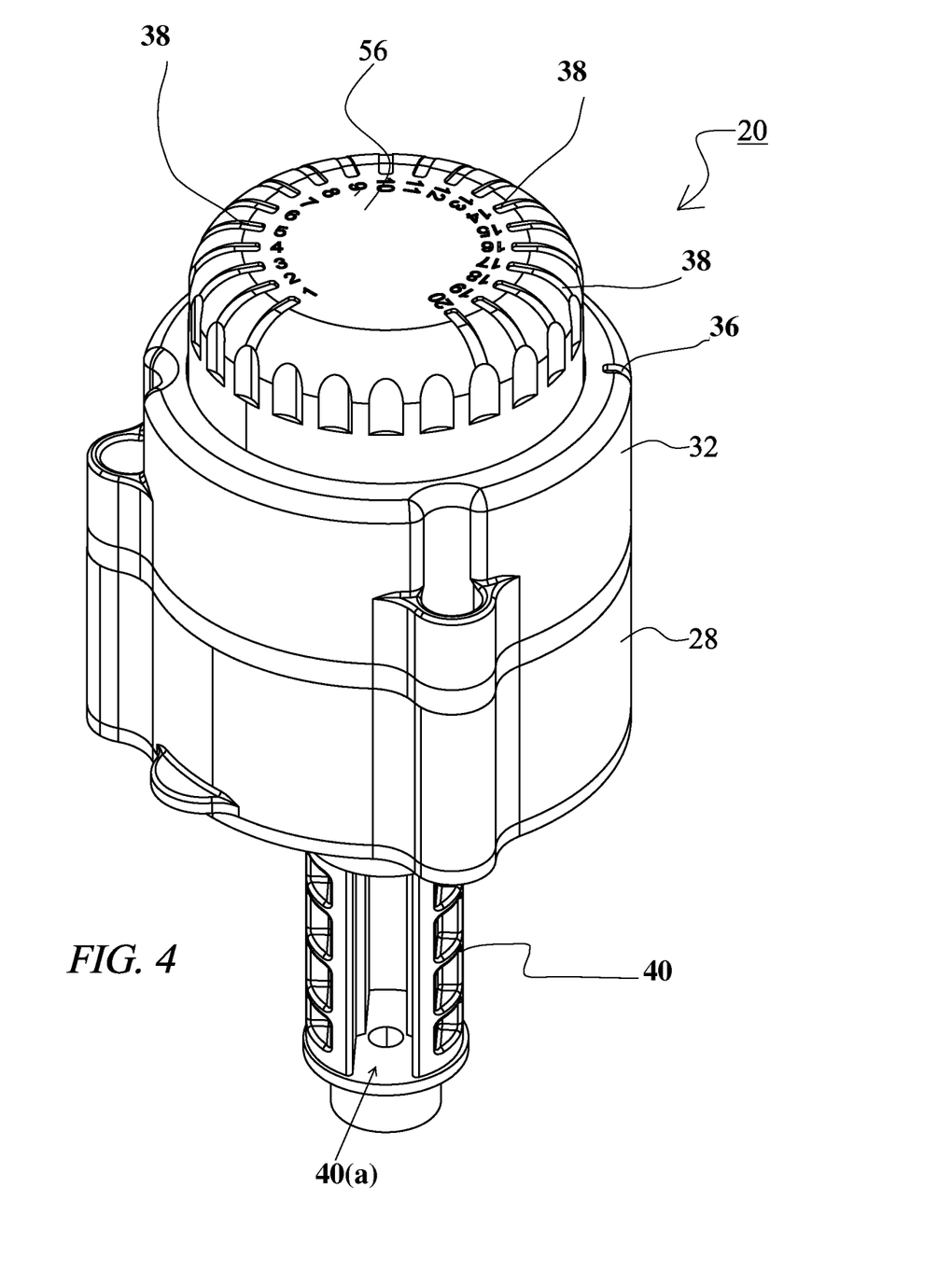
FIG. 4 is a perspective view of the payout limiter apparatus removed from the reel assembly.

FIGS. 3 and 4 illustrate a preferred, but non-limiting, embodiment of payout limiter 20. These figures depict payout limiter 20 removed from the associated reel lock assembly 22. In the depicted embodiment, limiter 20 includes first and second interconnected housing components (28 and 32, respectively). More specifically, the first and second housing components (28 and 32) are connected by housing closures (28(a) and 32(a)) that are secured together in facing relation (note FIG. 5). Limiter 20 also includes a dial 56 that is rotatably positioned within the second housing component 32. As noted hereinafter, dial 56 is used in determining the maximum payout of tether 24 from the associated reel lock assembly 22. Specifically, second housing component 32 includes a payout marker 36 on its exterior (note FIG. 3). Payout marker 36 can take the form of an indentation or indicia. The user selectively aligns marker 36 with one of the payout indicators 38 on dial 56 to indicate the maximum payout of tether 24. In the depicted embodiment, dial 56 includes twenty different settings 38, with each setting permitting successively longer lengths of tether 24 to be dispensed from reel 22. For example, with setting "1" limiter 20 serves to lock reel 22 after 1 foot of tether 24 has been unwound from shaft 40. Likewise, with setting "20" limiter 20 locks reel 22 after 20 feet of tether 24 have been unwound from shaft 40. Other lengths and settings can be provided depending upon the intended use of reel 22.

FIG. 4 illustrates an exposed reel shaft 40; however, in use the reel shaft 40 would be positioned within the associated reel lock assembly 22 and hidden. Housing components (28, 32) may be vertically and/or laterally positioned relative to each other depending upon the overall orientation of the apparatus. In the depicted embodiment first housing component 28 is secured to the end of the reel assembly 22 (note FIG. 1). In this regard the apparatus can be retrofitted to an existing reel assembly 22 or it can form the part of an original assembly 22.

Gear Train Subassembly

Figure 5:
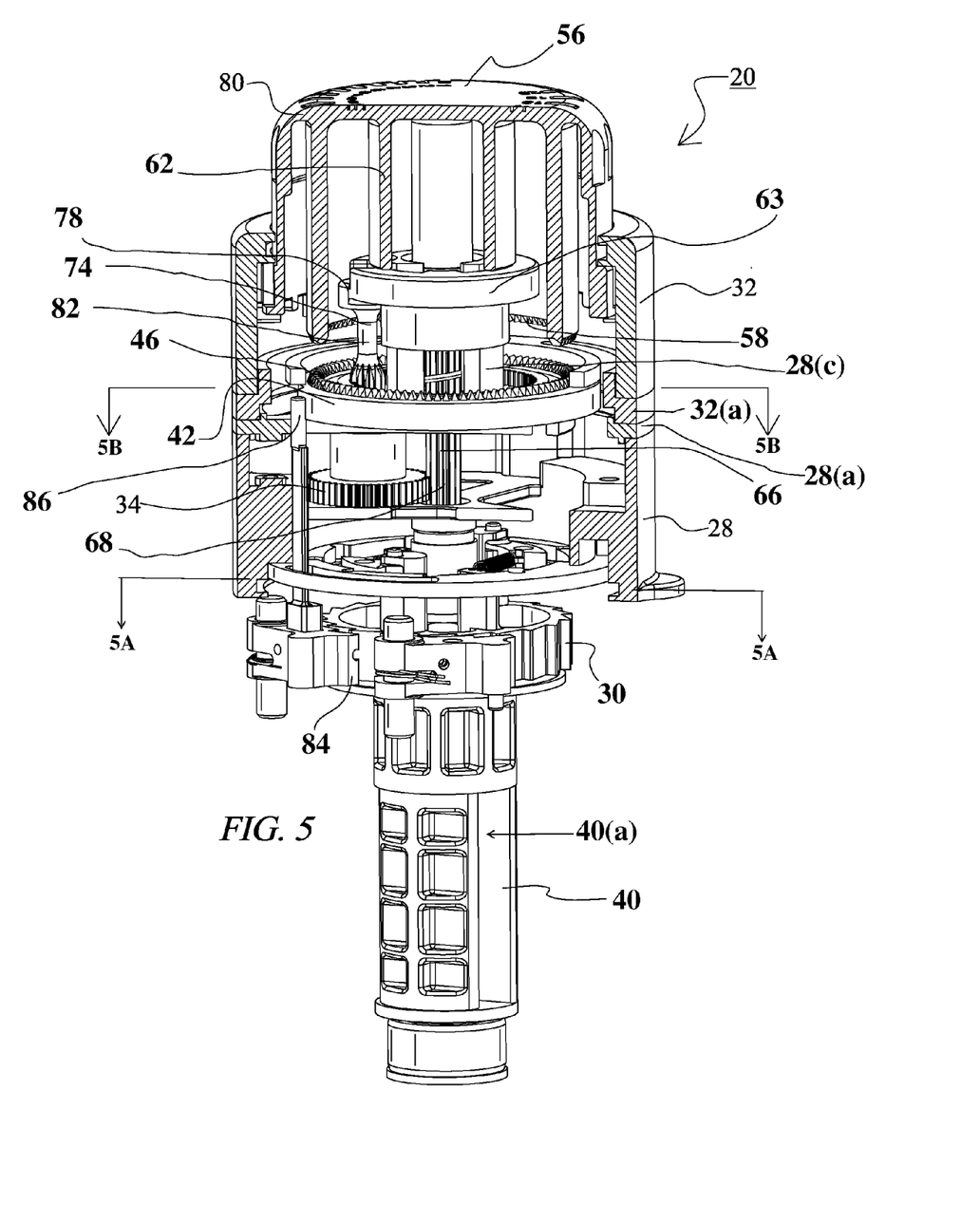
FIG. 5 is a partial cross sectional view of the payout limiter apparatus of FIG. 4.
Figure 5A:
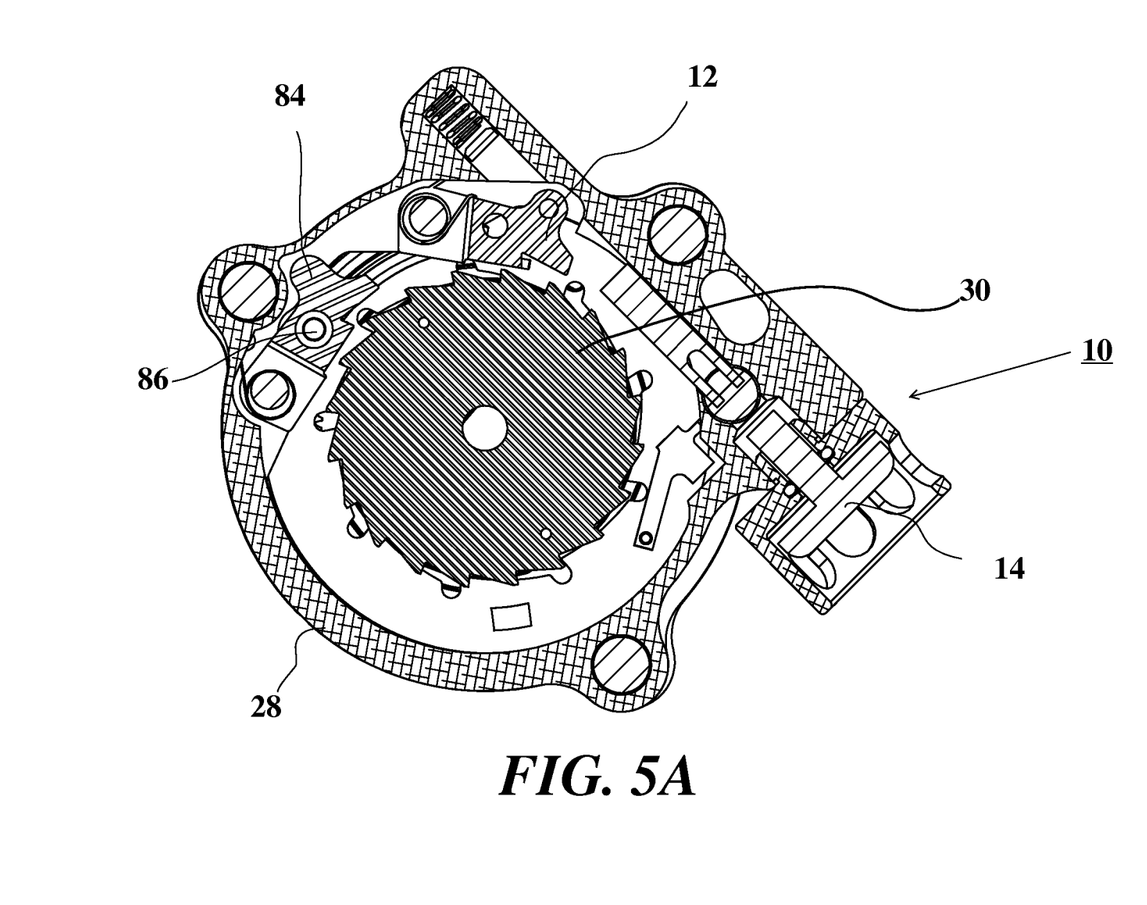
FIG. 5A is a cross sectional view taken along Line 5A of FIG. 5.
Figure 5B:
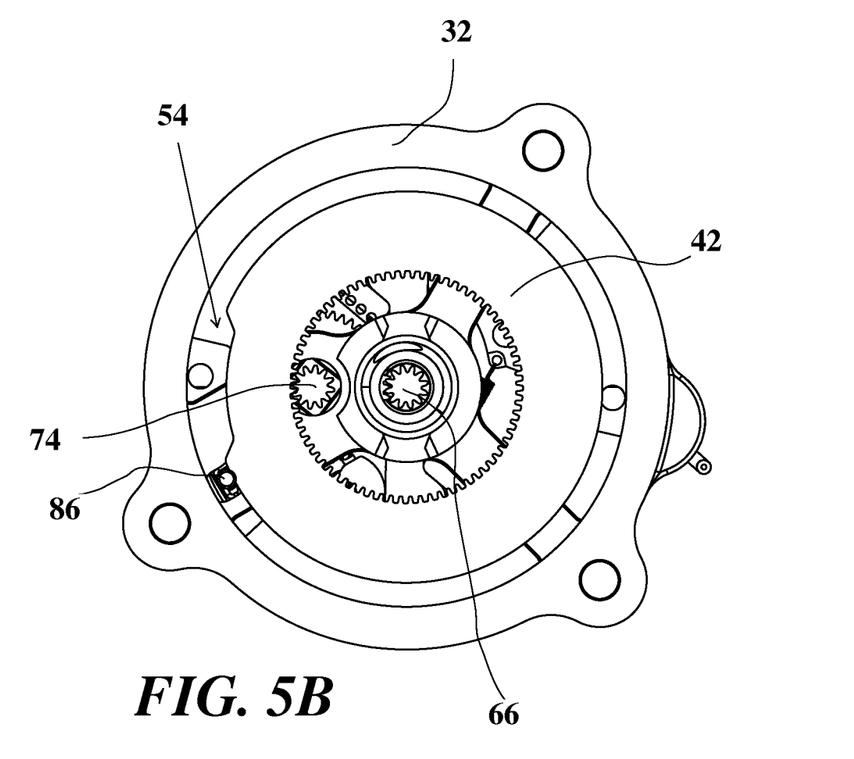
FIG. 5B is a cross sectional view taken along Line 5B of FIG. 5.

As most clearly depicted in FIG. 5, reel shaft 40 includes an elongated opening 40(a) for receiving the end of tether 24. Tether 24 can be wound and/or unwound from shaft 40 with shaft 40 positioned within reel 22. Reel shaft 40 can be formed via injection molding and may optionally include cutouts to reduce the overall weight of the shaft. Shaft 40 likewise includes a slotted opening 40(a) for retaining tether 24. Reel shaft 40 and housing components 28, 28(a), 32, and 32(a) can be formed from an impact resistant plastic.

Winding or unwinding webbing 24 from shaft 40 results in the rotation of reel shaft 40. Reel shaft 40 also includes a geared extent, or ratchet 30, at the end closest to housing 28. Rotation of reel 40 causes a concurrent rotation of ratchet 30. Ratchet 30 is used in locking or unlocking shaft 40 in a manner described more fully hereinafter. A pinion shaft 66 is secured to an opposite end of reel shaft 40 and likewise rotates along with reel shaft 40. As illustrated in the exploded view of FIG. 6, pinion shaft 66 can be secured to reel shaft 40 via a male-female coupling. Coupling pinion shaft 66 to reel shaft 40 in this fashion results in reel shaft 40 and pinion shaft 68 rotating in unison with one another. Pinion shaft 66 also includes a geared external surface 68. This geared surface 68 is in contact with and rotates an adjacent gear 34 within the first housing component 28. Gear 34 is preferably offset from the central axis of apparatus 20 and is rotatably connected to supports 28(b) that are internal to housing 28 (note FIG. 6).

With reference to FIG. 5, the ring gear 42 of apparatus 20 is depicted. Ring gear 42 is centrally positioned within second housing component 32. As noted in FIG. 6, ring gear 42 has both an internal geared surface 44 and an external geared surface 46 upon an upper surface. Ring gear 42 also includes a peripheral edge 48. The majority of ring gear 42 includes an arcuate, or circular, peripheral edge 52. However, a cut-out portion 54 is included within the peripheral edge 48. Cut-out 54 is stepped inwardly with respect to peripheral edge 48. Cut-out 54 is used to trip a pawl 84 and lock the reel shaft 40 as described more fully hereinafter.

Clutch Subassembly

Dial 56 is rotatably positioned within second housing 32. A washer 33 is preferably fitted between the outer surface of dial 56 and the inner surface of housing 32. Dial 56 also includes a geared lower surface 58 that is aligned with and adapted to engage the external geared surface 46 of ring gear 42 (note FIG. 5). Dial 56 includes a central shaft 62 which is used in mounting dial 56 to the second housing component 32. Specifically, central shaft 62 is interconnected to an upstanding portion 28(c) of housing closure 28(a) via bearings 63 and 65. A spring 64 is used to bias dial 56 relative to housing components 28 and 32. In this manner, dial 56 can be depressed inwardly to overcome the force of spring 64 and mesh lower geared surface 58 with the external geared surface 46 of ring gear 42. As explained below, pushing dial 56 inwardly also breaks a gear train that is otherwise formed between shaft 40 and ring gear 42. With dial 56 depressed, both dial 56 and ring gear 42 can be concurrently rotated to adjust the relationship between the upper end 86 of pawl and cut-out portion 54 of the ring gear 42.

Figure 6:
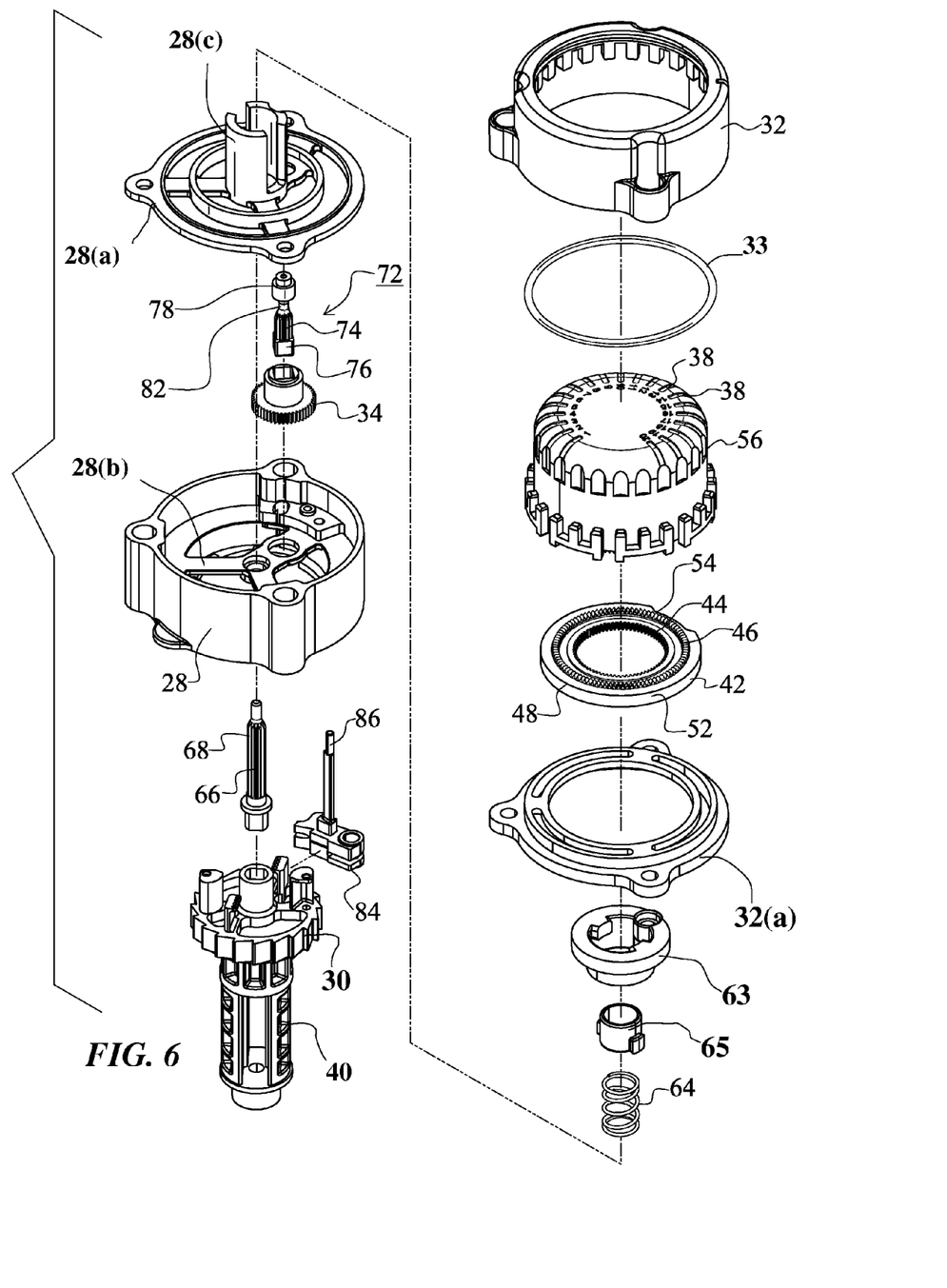
FIG. 6 is an exploded view of the payout limiter.
Figure 7:
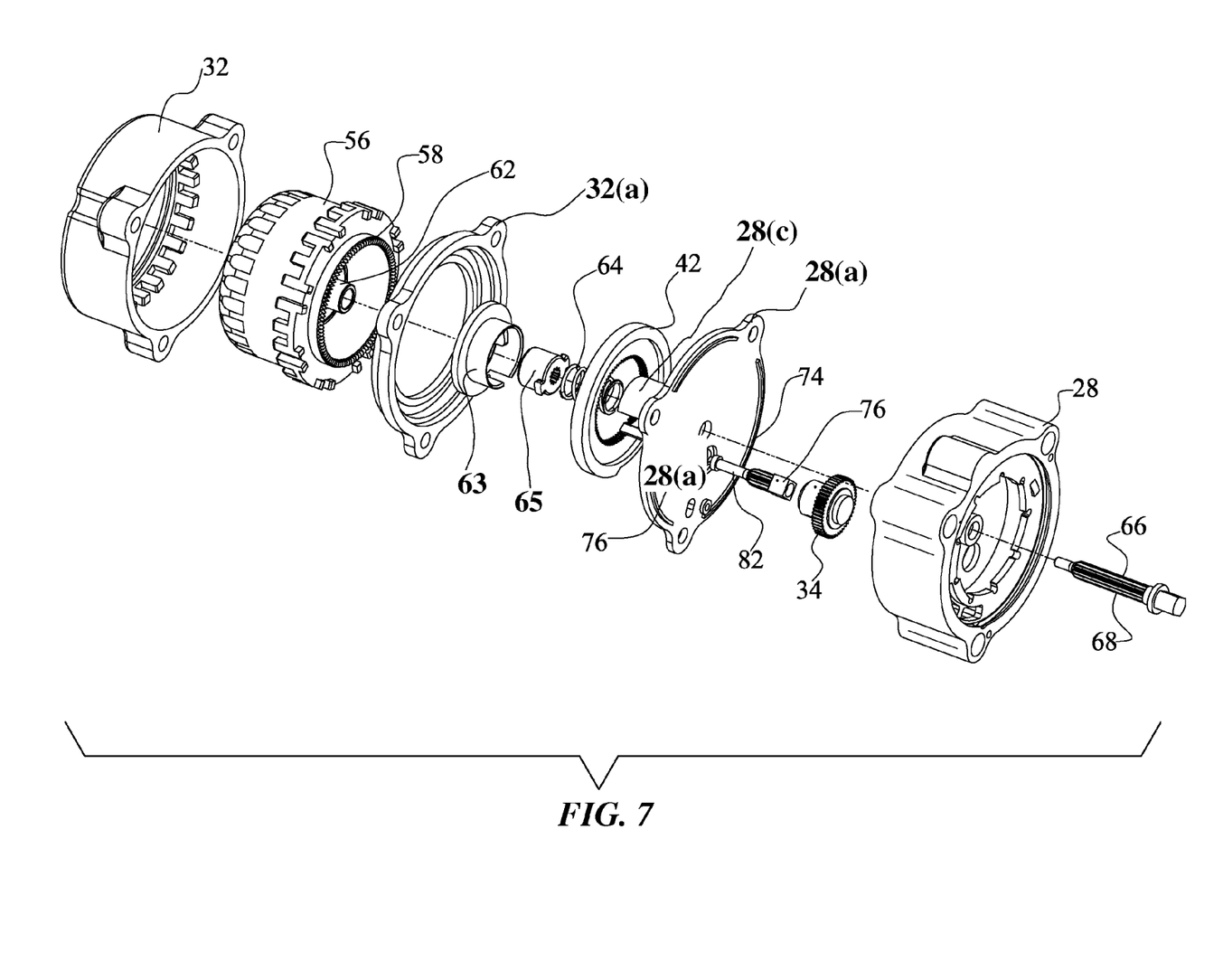
FIG. 7 is an additional exploded view of the payout limiter.

With reference to FIG. 6, pinion shaft 66 of apparatus 20 is depicted. Pinion shaft 66 is oriented along the axis of apparatus 20 and is secured between the reel shaft 40 and central shaft 62 of dial 56. In the preferred embodiment, pinion shaft 66 is fixedly secured to the reel shaft 40 such that there is a one to one gear ratio between them. The opposite end of pinion shaft 66 is received within a lower aperture within bearing 65 (note FIG. 7). Pinion shaft 66 includes a geared external surface 68 that engages offset gear 34 in the first housing component 28. The respective radii of offset gear 34 and pinion shaft 66 are selected such that rotation of pinion shaft 66 effects the rotation of offset gear 34 at a first gear ratio. In one embodiment, a four to one gear reduction ratio is utilized.

A clutch mechanism 72 is used to engage and/or disengage reel shaft 40 from ring gear 42 (FIG. 6). More specifically a geared pinion clutch 74 is employed by assembly 20. Pinion clutch 74 includes one end 76 that is interconnected to offset gear 34 and an opposite end 78 that engages central shaft 62 of dial 56 via bearing 63 (note FIG. 5). Pinion clutch 74 has a first axial position in which the geared portion of clutch 74 engages the internal geared surface 44 of the ring gear 42. In a second axial position, a tapered and ungeared extent 82 is aligned with ring gear 42. In this second axial orientation, pinion clutch 74 is not engaged with ring gear 42. Pinion clutch 74 is brought into the second axial position with dial 56 depressed. Namely, by depressing dial 56, central shaft 62 and bearing 63 push pinion clutch 74 downwardly such that the tapered portion 82 is aligned with ring gear 42. Thus, in second axial orientation, the gear train between ring gear 42 and shaft 40 is broken. This permits ring gear 42 to rotate freely and independently of shaft 40. After user releases dial 56, spring 64 returns clutch 74 to its first axial orientation and re-engages the gear train.

As described, rotation of reel shaft 40 causes the rotation of offset gear 34 and this, in turn, causes rotation of pinion clutch 74. With pinion clutch 74 in the first axial position, the rotation of pinion 74 causes the rotation of the ring gear 42. The radius of pinion clutch 74 and the radius of ring gear 42 are selected to affect a desired gear reduction. In the preferred embodiment, the gear reduction ratio between the pinion clutch 74 and ring gear 42 is six to one. Overall, a twenty-four to one gear reduction ratio is achieved through the gear train from reel shaft 40 to ring gear 42 (four to one between the reel shaft 40 and offset gear 34 and six to one between the pinion clutch 66 and ring gear 42. As noted, with pinion clutch 74 in the second orientation, rotation of reel shaft 40 does not affect the rotation of ring gear 42.

Locking Pawl Subassembly

A pawl 84 is used to selectively and/or unlock reel shaft 40. Pawl 84 is pivotally coupled to first housing component 28 and has both a first disengaged orientation and a second engaged orientation. These two different orientations are achieved depending upon whether an upper extent 86 of pawl 84 is in contact with the arcuate extent 52 of ring gear 42 or the cut-out 54. With pawl 84 in the first orientation the upper extent 86 of pawl 84 is in contact with, and rides about, the arcuate extent 52. In this orientation, the radius of ring gear 42 prevents the lower pawl 84 from engaging ratchet 30 associated with shaft 40. This, in turn, permits reel shaft 40 to rotate freely and thereby take up or pay out tether 24. However, in the second orientation, the upper extent of pawl 84 is in contact with the cut-out portion 54 of ring gear 42. When pawl 84 encounters cut-out 54, the lower pawl 84 is permitted to pivot inwardly towards ratchet 30. The continued pivotal movement of pawl 84 causes it to engage the teeth of ratchet 30. This, in turn, locks reel shaft 40 and prevents the further payout of tether 24. This is the second engaged orientation. A spring may be included to urge pawl 84 into the second orientation.

In use, the apparatus 20 is adjusted by first depressing inwardly on dial 56 to overcome the force of spring 64. This, in turn, causes the lower teeth 58 of dial 56 to engage the upper geared surface 46 of ring gear 42. This also has the affect of bringing the pinion clutch 74 into the second axially displaced positioned such that ring gear 42 and reel shaft 40 rotate independently. Thereafter, dial 56 can be rotated along with ring gear 40 in a one to one ratio. The user then selects a desired payout length with the positions being indicated by the payout marker 36 and payout indicators 38. These indicators signify the relative position of upper extent of pawl 86 to the second linear extent 54 of ring gear 42. Namely, if a maximum payout is desired, pawl 84 is positioned at a maximum distance away from linear extent 54. Conversely, if a minimal payout is desired, pawl 84 is oriented in a position nearby linear extent 54. The payout indicators 38 thus specify the distance between pawl 84 and the linear extent 54. Once the position is set, the user releases dial 56, thereby permitting spring 64 to return dial to its unbiased orientation. In this orientation, pinion clutch 74 is in the first axial orientation such that it geared extent meshes with the internal teeth 44 of ring gear 42. This completes a gear train between shaft 40 to ring gear 42. Namely, rotation of shaft 40 rotates pinion shaft 66 and offset gear 34. Offset gear 34, in turn, rotates pinion clutch 74 and ring gear 42. In the preferred embodiment, there is a gear reduction between shaft 40 and ring gear 42. After shaft 40 has completed a predetermined number of rotations, upper extent 86 contacts cut-out 54 to trip pawl 84 and lock ratchet 30. A manual level or switch can be provided to reset pawl 84 and permit tether 24 to be rewound.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. An apparatus for selectively adjusting the maximum payout of tether from a reel assembly, the reel assembly including a reel shaft with a ratchet, the apparatus comprising:

first and second housing components, the first housing component being interconnected to the reel assembly and including an offset gear, the second housing component including a payout marker;

a ring gear rotatably positioned within the second housing component, the ring gear having both external and internal geared surfaces, the ring gear further including a peripheral edge with an arcuate extent and a cut-out;

a dial rotatably positioned within the second housing component, the dial including a lower geared surface and an outer face with a series of payout indicators, the dial further including a central shaft, the payout indicators of the dial being selectively alignable with the payout marker to indicate the maximum payout of the tether from the reel assembly, a spring biasing the lower geared surface of the dial out of engagement with the external geared surface of the ring gear;

a pinion shaft interconnected between the reel shaft and the central shaft of the dial, the pinion shaft including a geared extent, the geared extent meshed with the offset gear of the first housing component, whereby rotation of the reel shaft rotates the offset gear at a first reduction ratio;

a pinion clutch interconnected to the offset gear, the pinion clutch having a first position wherein the pinion clutch is engaged with the internal geared surface of the ring gear and a second axially displaced position wherein the pinion clutch is not engaged with the ring gear, whereby rotation of the reel shaft causes the rotation of the pinion shaft, offset gear and pinion clutch, and whereby with the pinion clutch in the first position, rotation of the pinion clutch causes rotation of the ring gear at a second reduction ratio;

a pawl pivotally coupled to the first housing component, the pawl having an upper extent adapted to ride about the peripheral edge of the ring gear, the pawl having a first orientation wherein the upper extent is in contact with the arcuate extent of the ring gear and the pawl is prevented from engaging the ratchet of the reel shaft and the reel shaft is permitted to rotate freely, the pawl having a second orientation wherein the upper extent is in contact with the cut-out of the ring gear and whereby the pawl is permitted to engage the ratchet and lock reel shaft and limit the maximum payout of the tether;

wherein the apparatus can be adjusted by depressing the dial to overcome the force of the spring and thereby engage the lower teeth of the dial with the upper geared surface of the ring gear, depressing the dial brining the pinion clutch into the second axially displaced position whereby the ring gear and reel shaft rotate independently, depressing the dial also permitting the ring gear and dial to be rotated together, with such rotation orienting the upper extent of the pawl relative to the cut-out of the ring gear to thereby selectively adjust the maximum payout of the tether from the reel shaft.

2. An apparatus for selectively adjusting the maximum payout of tether from a reel shaft, the apparatus comprising:
   a housing interconnected to the reel shaft and including an offset gear;
   a ring gear rotatably positioned within the housing, the ring gear having an internal geared surface, the ring gear further including a peripheral edge with a cut-out;
   a dial rotatably positioned within the housing and adapted to selectively engage the ring gear;
   a pinion shaft interconnected between the reel shaft and the dial, the pinion shaft including a geared extent that engages the offset gear, whereby rotation of the reel shaft rotates the pinion shaft and offset gear;
   a pinion clutch interconnected to the offset gear, the pinion clutch having a first position wherein the pinion clutch is engaged with the internal geared surface of the ring gear and a second axially displaced position wherein the pinion clutch is not engaged with the ring gear, whereby with the pinion clutch in the first position, rotation of the reel shaft causes rotation of the pinion shaft, offset gear, the pinion clutch, and ring gear;
   a pawl pivotally coupled to the housing, the pawl having an upper extent in contact with the peripheral edge of the ring gear, the pawl having a locked orientation wherein the upper extent is in contact with the cut-out of the ring gear and the pawl engages and locks the reel shaft.

3. The apparatus as described in claim 2 wherein a 24 to 1 gear reduction ratio is provided between reel shaft and ring gear.

4. The apparatus as described in claim 2 wherein indicia are provided upon the dial and housing to indicate an initial position between the upper extent of pawl and the cut-out.

5. The apparatus as described in claim 2 wherein a length of tether is secured to the reel shaft.

6. The apparatus as described in claim 2 wherein the dial can be pushed inwardly with respect to the housing to place the pinion clutch in the second axially displaced position.

7. The apparatus as described in claim 2 wherein the dial includes a lower geared surface and the ring gear includes an upper geared surface such that by meshing the two geared surface the dial and ring gear can be rotated in unison.

8. The apparatus as described in claim 2 wherein a spring is included to bias the pawl to the locked orientation.

9. The apparatus as described in claim 2 wherein the reel shaft includes cutouts to reduce weight.

10. The apparatus as described in claim 2 wherein a reset switch is included for disengaging the pawl from the ratchet.

11. An apparatus for selectively adjusting the maximum payout of tether from a reel shaft, the apparatus comprising:
    a housing interconnected to the reel shaft and including an internal gear;
    a ring gear rotatably positioned within the housing, the ring gear having an internal geared surface, the ring gear further including a peripheral edge with a cut-out;
    a dial rotatably positioned within the housing and adapted to selectively engage and rotate the ring gear;
    a pinion shaft interconnected between the reel shaft and the dial, the pinion shaft including a geared extent that engages the internal gear, whereby rotation of the reel shaft rotates the pinion shaft and offset gear;
    a pinion connected to the internal gear and engaged with the internal geared surface of the ring gear, whereby rotation of the reel shaft causes rotation of the pinion shaft, the internal gear, the pinion, and the ring gear;
    a pawl pivotally coupled to the housing, the pawl having an upper extent in contact with the peripheral edge of the ring gear, the pawl having a locked orientation wherein the upper extent is in contact with the cut-out of the ring gear and the pawl engages and locks the reel shaft;
    whereby the dial can be used to selectively rotate ring gear to set the initial distance between the upper extent of pawl and the cut-out of ring gear.

12. The apparatus as described in claim 11 wherein the dial includes a lower geared surface and the ring gear includes an upper geared surface such that by meshing the two geared surface the dial and ring gear can be rotated in unison.

13. The apparatus as described in claim 11 wherein a spring is included to bias the pawl to the locked orientation.

14. The apparatus as described in claim 11 wherein the reel shaft includes cutouts to reduce weight.

15. The apparatus as described in claim 11 wherein a reset switch is included for disengaging the pawl from the ratchet.

16. The apparatus as described in claim 11 wherein a 24 to 1 gear reduction ratio is provided between reel shaft and ring gear.

* * * * *